US010277158B2

(12) United States Patent
Stephan et al.

(10) Patent No.: US 10,277,158 B2
(45) Date of Patent: Apr. 30, 2019

(54) CLAMPS FOR SECURING SOLAR ENERGY PANELS

(71) Applicant: PEGASUS SOLAR INC., Richmond, CA (US)

(72) Inventors: Erich Kai Stephan, Newport Beach, CA (US); Glenn Harris, Sausalito, CA (US)

(73) Assignee: PEGASUS SOLAR INC., Richmond, CA (US)

( * ) Notice: Subject to any disclaimer, the term of this patent is extended or adjusted under 35 U.S.C. 154(b) by 0 days.

(21) Appl. No.: 15/584,799

(22) Filed: May 2, 2017

(65) Prior Publication Data

US 2017/0237386 A1 Aug. 17, 2017

Related U.S. Application Data

(63) Continuation of application No. 14/887,231, filed on Oct. 19, 2015, now Pat. No. 9,660,570.

(60) Provisional application No. 62/066,240, filed on Oct. 20, 2014, provisional application No. 62/066,243, filed on Oct. 20, 2014.

(51) Int. Cl.
| | |
|---|---|
| A47B 97/00 | (2006.01) |
| H02S 20/20 | (2014.01) |
| F16B 2/06 | (2006.01) |
| F16B 5/00 | (2006.01) |
| H02S 20/23 | (2014.01) |
| F16B 5/06 | (2006.01) |

(52) U.S. Cl.
CPC .............. *H02S 20/20* (2014.12); *F16B 2/065* (2013.01); *F16B 5/0028* (2013.01); *H02S 20/23* (2014.12); *F16B 5/0685* (2013.01); *F16B 2005/0678* (2013.01); *Y02B 10/12* (2013.01)

(58) Field of Classification Search
CPC ....... H02S 20/30; F16B 5/0216; F24J 2/5211; F16M 11/06
See application file for complete search history.

(56) References Cited

U.S. PATENT DOCUMENTS

| | | | |
|---|---|---|---|
| 7,435,134 B2 * | 10/2008 | Lenox | F24J 2/5245 439/567 |
| 7,861,485 B1 | 1/2011 | Wentworth et al. | |
| 8,407,895 B2 | 4/2013 | Hartelius et al. | |
| 8,505,864 B1 | 8/2013 | Taylor et al. | |
| 8,627,617 B2 * | 1/2014 | Haddock | F24J 2/5249 136/251 |
| 8,683,761 B2 | 4/2014 | Danning | |
| 8,702,335 B2 | 4/2014 | Young | |
| 8,813,441 B2 | 8/2014 | Rizzo | |
| 9,010,140 B2 | 4/2015 | Cook | |
| 9,142,700 B2 | 9/2015 | Meine et al. | |

(Continued)

OTHER PUBLICATIONS

International Search Report and Written Opinion by the International Searching Authority, dated Jan. 8, 2016, 14 pages, for the corresponding International Application PCT/US2015/056512.

*Primary Examiner* — Amy J. Sterling
(74) *Attorney, Agent, or Firm* — Polsinelli LLP

(57) ABSTRACT

Clamp assemblies for mounting solar panels and accessories. Clamp assemblies can have geometric features, shaped apertures for fasteners, and measured protrusions for allowing clamp rotation, lateral adjustment, self-alignment, and angled surfaces for facilitating installation of a solar panel.

9 Claims, 12 Drawing Sheets

(56) References Cited

U.S. PATENT DOCUMENTS

| | | |
|---|---|---|
| 9,422,957 B2 | 8/2016 | Dinh |
| 9,825,581 B2 * | 11/2017 | Wildes .................... H02S 20/23 |
| 9,831,818 B2 * | 11/2017 | West ........................ H02S 20/30 |
| 2006/0086382 A1 | 4/2006 | Plaisted |
| 2011/0000520 A1 | 1/2011 | West |
| 2012/0248271 A1 | 10/2012 | Zeilenga |
| 2013/0200245 A1 | 8/2013 | Markiewicz et al. |
| 2015/0288320 A1 * | 10/2015 | Stearns ................... H02S 20/23 52/173.3 |
| 2016/0268958 A1 * | 9/2016 | Wildes .................... H02S 20/23 |

* cited by examiner

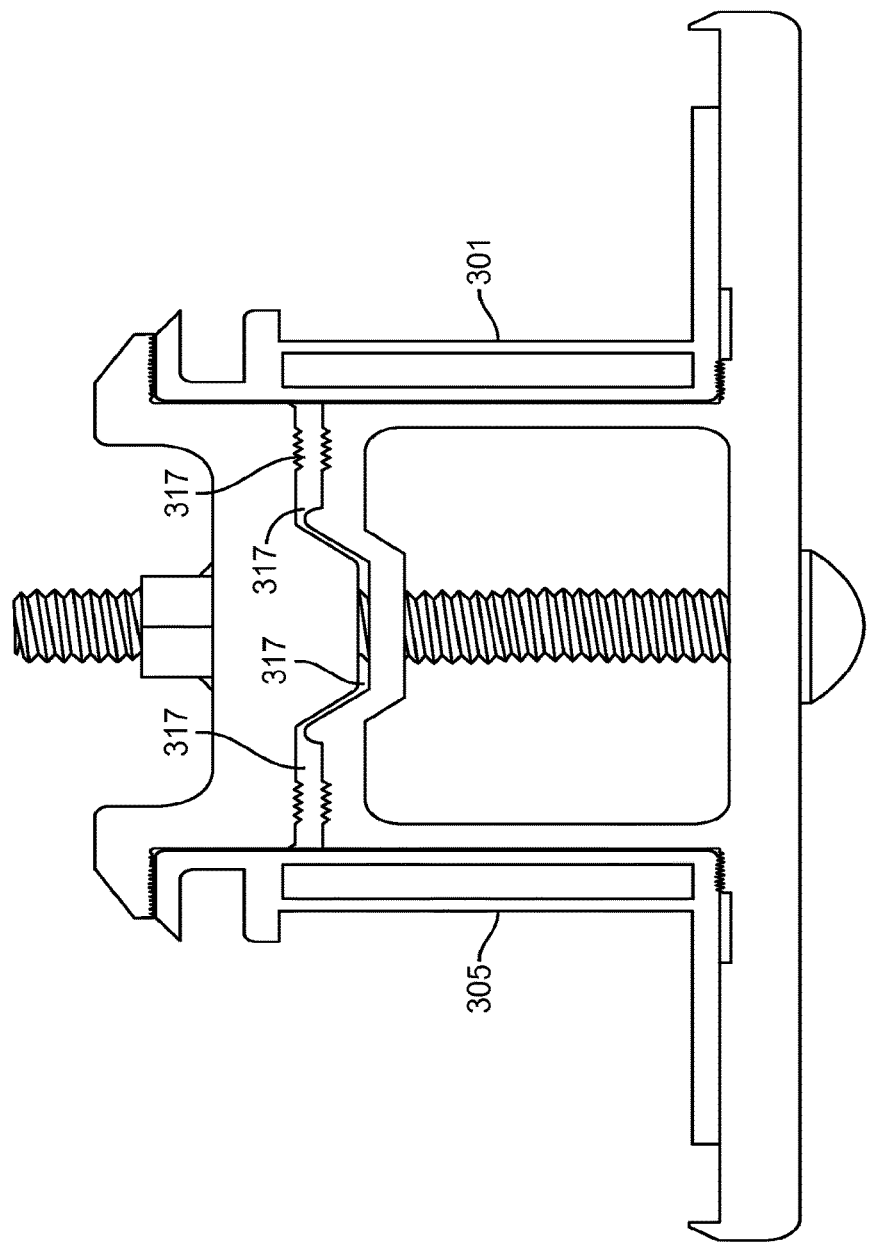

CLAMPS FOR SECURING SOLAR ENERGY PANELS

CROSS REFERENCE TO RELATED APPLICATIONS

This application claims priority to U.S. Provisional application No. 62/066,240, filed on Oct. 20, 2014, which is entitled "SELF-ALIGNING CLAMPS FOR SECURING SOLAR ENERGY PANELS," to U.S. Provisional application No. 62/066,243, filed on Oct. 20, 2014, which is entitled "METHOD OF INSTALLING A ROOF FLASHING," and to U.S. Non-provisional application Ser. No. 14/887,231, filed Oct. 19, 2015, which is entitled "CLAMPS FOR SECURING SOLAR ENERGY PANELS," each of which are expressly incorporated by reference herein in their entireties.

TECHNICAL FIELD

The present technology pertains to solar panel mounts, and more specifically pertains to self-aligning clamps for securing solar energy panels.

BACKGROUND

As solar energy becomes more economical to produce electricity for direct consumption, more solar energy systems are being installed on rooftops. Typically, components of the solar energy systems such as solar panels are installed using conventional mounting structures. However, conventional mounting structures typically require precise dimensions and can result in excessive material and extensive installation time.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Some embodiments of the present technology involve a clamp assembly for mounting solar panels and accessories. The clamp assemblies can include a top clamp with a substantially planar plate, raised flanges that extend away from the plate in opposite directions than the first raised flange; a geometric protrusion extending downward from the plate, and an aperture disposed through the plate and the geometric protrusion. The geometric protrusion of the top plate mates with a geometric cavity in a bottom clamp so that the top and bottom clamps self-align, thereby facilitating installation of a solar panel.

The bottom clamp can involve a base member having the geometric cavity disposed therein, flanges extending away from a lower surface of the base member in opposite directions and a bottom clamp aperture extending through the base member. The base member can also involve a geometric cavity in its top surface.

The top clamp and the bottom clamp are configured to freely rotate about a fastener inserted through the top clamp aperture and the bottom clamp aperture. However, when compressed enough, the geometric protrusion of the top plate mates with a geometric cavity in a bottom clamp so that the top and bottom clamps self-align. Also, in some embodiments, the top clamp aperture and the bottom clamp aperture are configured as a slot for allowing the top clamp and bottom clamp to adjust laterally without moving the fastener when the fastener is fixed to a particular location. The free rotation, the self-alignment, and the ability to laterally adjust the clamps are some of the features that facilitate installation of a solar panel.

The clamp assembly can include protrusions in the bottom clamp that act as a fulcrum for reducing toque on a fastener and for defining additional clamping surfaces for solar panel accessories, etc.

In some embodiments of the present technology, top and bottom flanges are substantially symmetrical on either side of the assembly, thereby enabling universal clamps. In some embodiments, the one base flange is angled upward toward the top clamp such that a solar panel can be inserted between the top clamp and the bottom clamp at an angle, thereby facilitating installation.

The clamp assembly can include various grooves for increasing the friction on a solar panel clamped between the top clamp and the bottom clamp, spikes for piercing an anodization layer of a solar panel clamped between the top clamp and bottom clamp for electrically bonding and grounding the clamp assembly and the solar panel.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 3A and 3B are end views showing one and two solar energy panels engaging with the clamp assembly representing one example of the present technology;

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

As explained above, conventional solar panel mounting structures require precise dimensions and can result in excessive material and extensive installation time. Accordingly, the present technology involves mounting clamps and mounting bridges that facilitate solar panel mounting and installation.

Some embodiments of the present technology involve self-aligning clamp assemblies configured to secure solar energy panels to a fixed body. The clamp assemblies can consist of a bottom clamp, a top clamp, and a fastener, such as a bolt and nut, to compress the top clamp and bottom clamp together.

The self-aligning clamp assemblies can be specifically designed to support solar energy panels, solar energy panel frames, etc. A bottom clamp can support one or more solar energy panels from downward forces, such as gravity, positive wind pressure, snow loading, or other forces that push the solar energy panel towards Earth. The top clamp, being held in place with a fastener to the bottom clamp, can prevent one or more solar energy panels from upward forces, such as a difference in air pressure that would pull upwards on the solar energy panel. When the bottom clamp and top clamp are compressed together on one or more solar energy panels, the clamps additionally prevent the solar energy panels from moving laterally. The clamp assembly can be secured to a fixed connection point on an installation surface using its own fastener, or with a secondary fastener, as explained in greater detail below. In some embodiments of the present technology, the clamps each have two clamping surfaces on opposite sides of a fastener, such that one or more solar energy panels can engage on both sides of each clamp.

Figure 1:
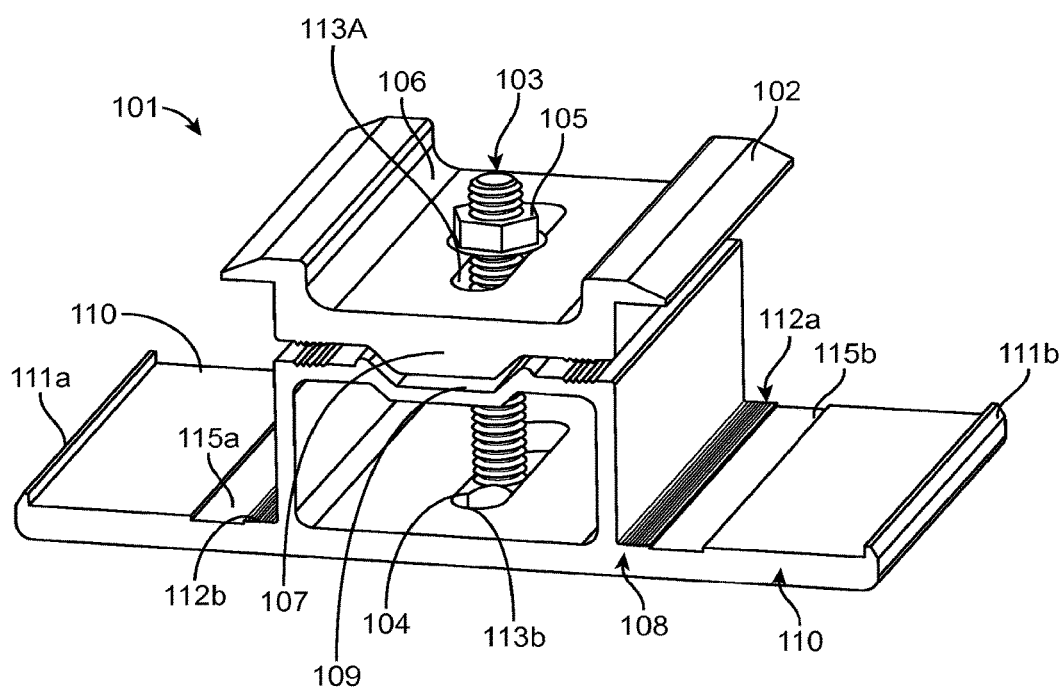
FIG. 1 is an isometric view of a clamp assembly representing one example of the present technology.

FIG. 1 is an isometric view of the clamp assembly 101 including of a top clamp 106, a bottom clamp 108, and a fastener 103. The fastener 103 may consist of a fastener bolt 104 and a fastener nut 105, and fastener bolt 104 extends through apertures 113a, 113b in the top clamp 106 and bottom clamp 108, respectively. Apertures 113a, 113b may be circular in shape (i.e. a hole) or a slot shape, as shown in FIG. 1. Turning the fastener nut 105 relative to the fastener bolt 104 will cause the fastener nut 105 and fastener bolt 104 to compress together, thereby compressing together the top clamp 106 to the bottom clamp 108.

The top clamp 106 can have an offset flange 102 that protrudes horizontally away from the body of the clamp. The lower surface of offset flange 102 can be substantially parallel with the top surface of the top clamp 106. Alternatively, the lower surface of offset flange 102 can be at an angle with the main top surface of the top clamp 106 such that, when the top clamp 106 is compressed to the solar energy panel (not shown), the top clamp 106 deflects under stress and the clamping surface is drawn down to be parallel with the top surface of the solar energy panel.

The bottom clamp 108 can have a main body with one or more horizontal flanges 110. As depicted in FIG. 1, bottom clamp 108 is symmetrical in shape and has a horizontal flange 110 on both sides of fastener 103 in order to capture multiple solar energy panels. These horizontal flanges 110 act as the lower clamping surface on a solar energy panel (not shown). The horizontal flanges 110 can also be the same size and shape to make the bottom clamp 108 symmetrical in shape. This has the benefit of universality, whereby either horizontal flange 110 can be used first in the installation process, making the clamps easier to use.

Horizontal flange 110 may have lips 111a, 111b on its outward edge in order to help capture a solar energy panel and to prevent the solar energy panel from readily sliding off of the horizontal flange 110 (i.e. the clamping surface). Also, the horizontal flanges 110 can have bottom clamp grips 112a, 112b may be a textured surface, grooved surface, or similar gripping feature to help hold a solar energy panel from moving when compressed by the top clamp 106 and bottom clamp 108.

Additionally, the horizontal flanges 110 can have a channel 115a, 115b traversing a lengthwise orientation with the module to fit a sheet metal part (not shown). This sheet metal part can have sharp spikes protruding upward and/or downward to cut a coating, such as anodization or paint, on the bottom clamp and/or the solar energy panel, thereby electrically bonding and grounding the two components together. The horizontal flange can have vertically protruding spikes (not shown) to penetrate the anodization layer of a solar energy panel with the purpose of creating an electrical grounding and bonding path. These spikes can be a separate component press or screw fit into a hole in the horizontal flange, and can be a molded or extruded as an integral feature of the horizontal flanges 110.

As explained above, the top clamp 106 and bottom clamp 108 can have apertures 113a, 113b passing there through to allow a fastener 103 to pass through. The aperture can be a hole, slot, aperture or similar cut-out. A slot can be beneficial as it allows the top clamp 106 and bottom clamp 108 to adjust laterally (along the z-axis) without moving the fastener 103, which can be fixed to a particular location.

Also, the top clamp 106 and the bottom clamp 108 can each consist of a single shape throughout their length (along the z-axis), allowing for manufacturing using an extrusion process which can be less expensive than other forms of manufacturing and allowing for universality during installation of a solar energy panel to the clamps 106, 108.

In some embodiments of the present technology, the top clamp 106 has a centrally positioned downward top clamp protrusion 107. This protrusion can be substantially trapezoidal, triangular, or square in shape, and can extend the entire length of the top clamp. The top clamp protrusion 107 engages with a similarly positioned bottom clamp cavity 109 on the top surface of the bottom clamp 108. As the top clamp 106 and bottom clamp 108 are drawn closer together, the top clamp protrusion 107 resides within the bottom clamp cavity 109 to prevent the two clamps from rotating relative to one another around the fastener. This ensures the two clamp pieces are substantially aligned with one another to provide even clamping surfaces on a solar energy panel. As shown in FIG. 1, the top clamp protrusion 107 can nest into bottom clamp cavity 109 as the top clamp 106 and bottom clamp 108 are drawn towards one another.

Figure 2A:
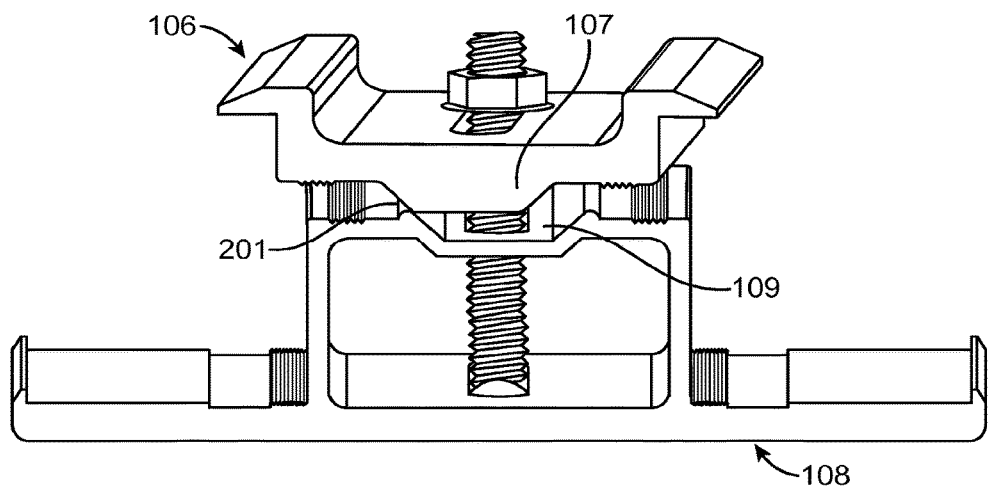
FIGS. 2A and 2B are end views depicting the self-aligning action of the clamp assembly representing one example of the present technology.
Figure 2B:
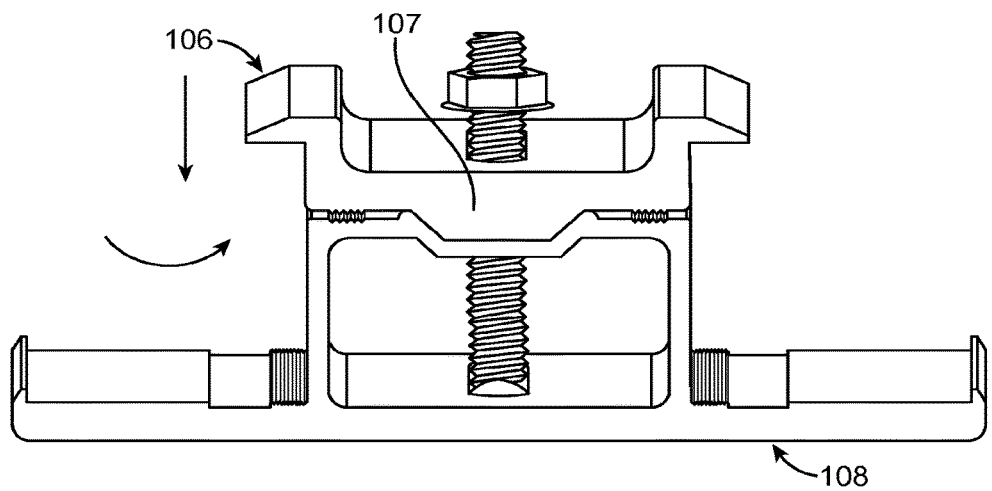

FIG. 2A depicts the top clamp 106 rotated some arbitrary amount relative to bottom clamp 108 around fastener 103 such that the end edges of both clamps are not parallel. As top clamp 106 approaches bottom clamp 108, an edge of top clamp protrusion 107 may contact an edge of bottom clamp cavity 109 at location 201. In one example of the present invention as shown in FIG. 2A, the top clamp protrusion 107 and bottom clamp cavity 109 are substantially trapezoidal in shape. In FIG. 2B, top clamp 106 has approached closer to bottom clamp 108, and the trapezoidal shape of top clamp protrusion 107 has slide along the surface of bottom clamp cavity 109, thereby rotating top clamp 106 so that the end edge of top clamp 106 is now substantially parallel with the end edge of bottom clamp 108, thereby reducing the need for positioning the clamps as they are compressed together during the installation on a solar energy panel.

Figure 3A:
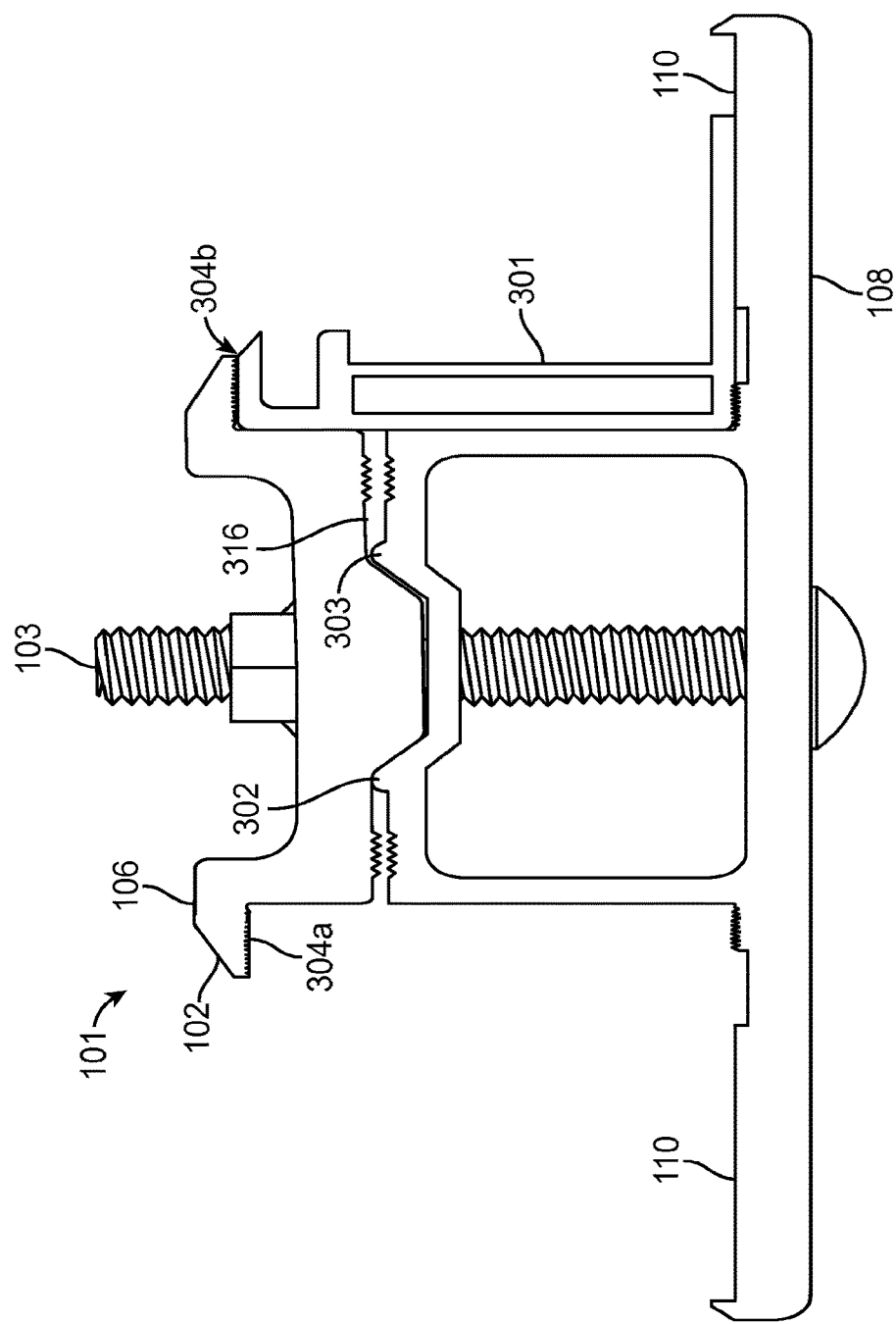

FIG. 3A depicts an end view of clamp assembly 101 with solar energy panel frame section 301 clamped in one side between top clamp 106 and bottom clamp 108.

In some embodiments of the present technology, the bottom clamp 108 can have two vertical protrusions 302, 303 on its topmost surface symmetrically located to either side of the cavity. When a solar energy panel frame section 301 is clamped between the sides of a top clamp 106 and bottom clamp 108, and the top clamp 106 is compressed towards the bottom clamp 108 using the fastener 103, the vertical protrusion furthest from the solar energy panel (302 in FIG. 3A) can be designed prevent the top clamp 106 from being tightened so much that the top clamp would exert too much torque on the fastener 103 when another solar energy panel is not installed on the opposite side.

The vertical protrusions 302, 303 can be dimensioned above the top surface of the horizontal flanges 110 such that the angle of articulation of the top clamp 106 around the fulcrum is great enough to maintain a clearance space 316 between the top clamp 106 and bottom clamp 108, yet small enough so not to impose permanent damage to the fastener 103 from bending. Also, the top clamp 106 will not be perfectly parallel with the bottom clamp 108 when the top clamp 106 is compressed to the solar panel frame section 301 using the fastener 103, however the angle created will not be so great as to substantially damage the fastener 103.

The overall height of bottom clamp 108 and vertical protrusions 302 and 303 may depend on the height of frame section 301, meaning a frame section of a different height may require a bottom clamp and vertical protrusion of a also a different height. Vertical protrusions 302 and 303 may be the same height and position on bottom clamp 108 in order to maintain universal functionality should a solar energy panel be installed on the opposite side compared to the orientation in FIG. 3A. The clamping surface on offset flange 102 may be at an acute angle relative to the vertical plane of the clamp assembly 101. This feature allows for the clamping surface to be relatively parallel with the top of the frame section 301 when the top clamp 106 articulates around frame section 301 as it is compressed down.

FIG. 3B depicts the assembly in FIG. 3A with the addition of a second frame section 305. In some embodiments, as shown in FIG. 3B, the dimensions of the components are configured such that when solar panel frame sections 301, 305 are located on both sides of clamp assembly 101, and the top clamp 106 is compressed towards the bottom clamp 108 using the fastener 103, the vertical protrusions 302, 303 do not interfere with the top clamp 106 and a clearance space 317 can be maintained between the top clamp 106 and bottom clamp 108 such that pressure from tightening the fastener is transferred to the solar energy panels 301, 305 and not to the vertical protrusions 302, 303. Also, in these configurations, the top clamp 106 and bottom clamp 108 can be substantially parallel to one another when compressed together using the fastener 103.

Also, as shown in FIGS. 3A and 3B, the clamping surfaces of the top clamp 106 can have substantially triangularly shaped sets of grooves 304a, 304b or a textured surface that help induce additional friction on the solar energy panel to prevent it from moving when compressed by the top and bottom clamp.

Figure 4:
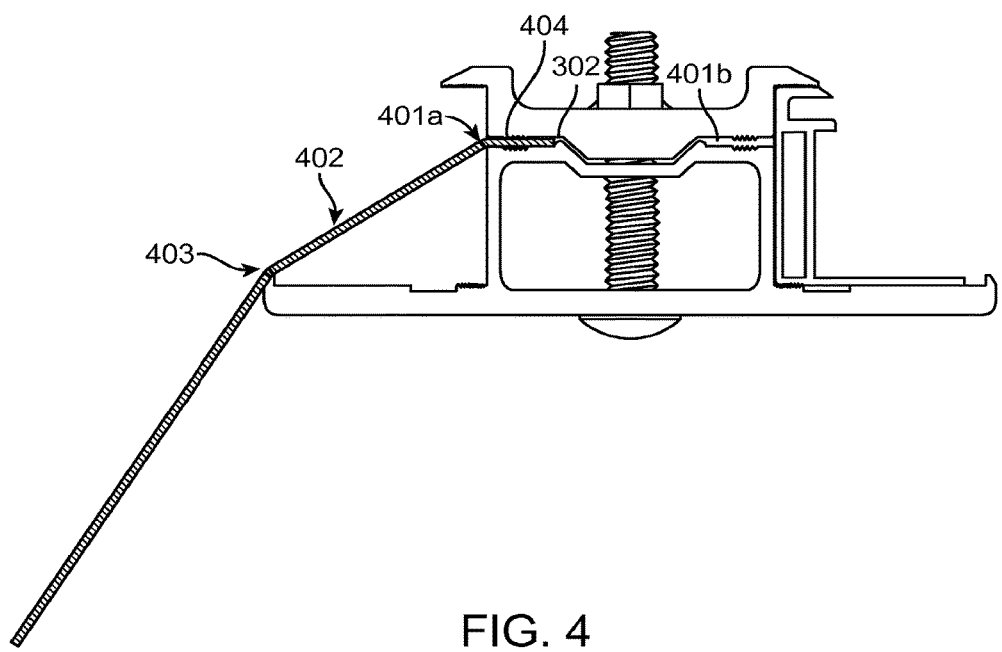
FIG. 4 is an end view depicting an accessory being clamped in a secondary clamping location representing one example of the present technology.

FIG. 4 depicts a side view of a clamp assembly 101 with gaps 401a, 401b of a particular height and depth between the lower surface of the top clamp 106 and the upper surface of the bottom clamp 108. The gaps 401a, 401b can be used as a second clamp for accessories, such as a formed piece to sheet metal that angles downward to restrict air movement under a solar energy panel, an electrical connections box, electrical conduit, or similar accessories. The accessories can have a horizontal tab that can be placed in the gaps 401a, 401b to secure the accessory to the clamp assembly. When the tab of an accessory is placed in the gaps 401a, 401b and the fastener 103 tightened to compress the top clamp 106 towards the bottom clamp 108, the top clamp 106 may press down on the accessory's tab and not on the vertical protrusion furthest from the solar energy panel. The accessory tab causes the top clamp 106 to behave similar to as if two or more solar energy panels are on both sides of the clamp assembly 101. The surfaces of the top clamp 106 and bottom clamp 108 creating the gap can be textured and can have grooves cut in place to increase friction on an accessory's tab. The vertical protrusion of the bottom clamp 108 may act as a wall to prevent the accessory's tab from sliding too far in between the top and bottom clamps.

In some embodiments of the present technology, a shaped plate is clamped in the gaps 401a, 401b between the top clamp 106 and bottom clamp 108, and extends downward towards an installation surface over which the solar energy panels reside. One purpose of the plate is to deflect airflow over one or more solar energy panels, reducing pressures on the underside of the solar energy panels. Another purpose is to deflect flame over one or more solar energy panels and prevent a fire from spreading to under one or more solar energy panels. The plate can have one or more bends in it to conform to the top clamp 106 and bottom clamp 108, and bend to rest on the outer edge of the bottom clamp's 108 horizontal flange 110.

In FIG. 4, a clamp assembly 101 has a solar energy panel frame section 301 engaged on one side, and wind deflector 402 engage on an opposing side. In this example embodiment, the gap 401a is created between the top clamp 106 and bottom clamp 108 when the two pieces are compressed onto the frame section 305 and the top and bottom clamp remain substantially parallel with one another. The gap 401a may have a textured or grooved surface 404 to aid in gripping any component that may be clamped, such as wind deflector 402. Wind deflector 402 has a thickness such that the compressive forces from the top and bottom clamp will be placed on the wind deflector 402, and not on vertical protrusions 302 and 303. Vertical protrusion 302 also acts as a guide to prevent installing the wind deflector 402 too far into the gap 401a. Other accessories, such as an electrical wiring box, wiring conduit clip, electronic inverter, or weather station, may have a tab that can be clamped in the gap 401a in a similar method to that of the wind deflector 402. In one example of the present invention, wind deflector 402 has one or more bends to reduce the horizontal distance occupied when achieving a desired height. In some embodiments of the wind deflector 402, these bends may sum to an angle less than 90 degrees, thereby allowing multiple wind deflectors to snuggly nest upon one another for packaging and shipping. The wind deflector 402 may bend around the outer edge of horizontal flange 110 at point 403. In this example, the wind deflector is supported at both gap 401 and point 403.

Figure 5A:
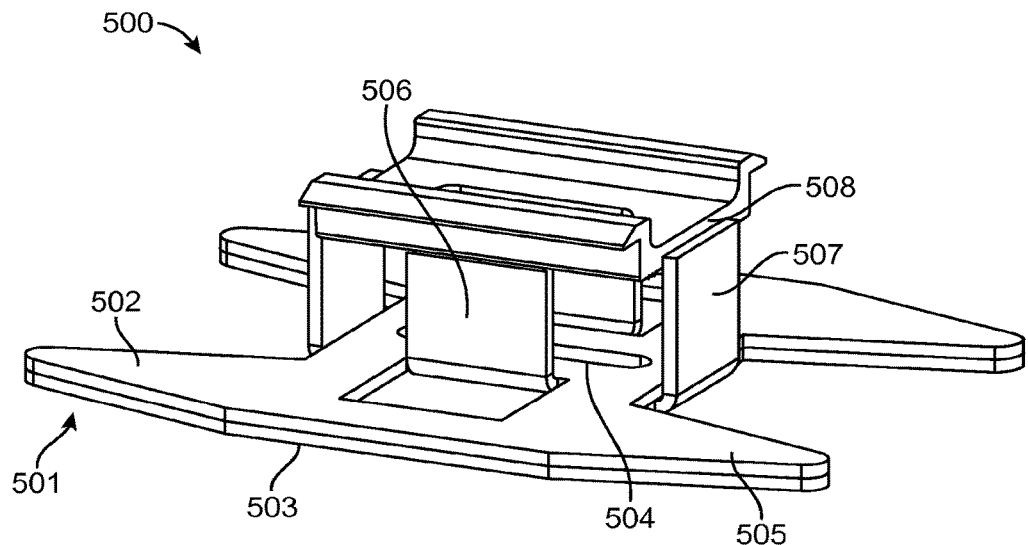
FIG. 5A and 5B is a perspective view showing a sheet metal type lower clamping surface representing one example of the present technology.

Those with ordinary skill in the art having the benefit of this disclosure will appreciate that a wide variety of materials can be suited to carry out the present technology. In some embodiments of the present technology, the bottom clamp is formed of a sheet metal, a composite material, etc. FIG. 5A illustrates a self-aligning clamp according to some embodiments of the present technology. FIG. 5A illustrates a clamp assembly 500 with a sheet metal bottom clamp 501 having an upper plate 502 resting on lower plate 503 and assembled together to a top clamp 508 with a fastener through an aperture 504.

When the bottom clamp 501 has a substantially rigid structure, meaning the horizontal flanges deflect significantly less in proportion to the deflection of a solar energy panel when under downward force, point stresses can build up on the solar energy panel at the edge of the bottom clamp. To prevent this stress build-up, the horizontal flanges of the bottom clamp 501 are used to bend downward a particular amount as the solar energy panel deflects, with the purpose being to reduce point stresses on the solar energy panel at the edge of the bottom clamp. A design pointing stresses between the horizontal flanges and the solar energy panel tapers the horizontal flanges as they extend along the length of the solar energy panel. This tapered feature reduces point stress induced on the solar energy panel or the solar energy panel frame by the bottom clamp as a downward force is applied to the solar energy panel.

Figure 5B:
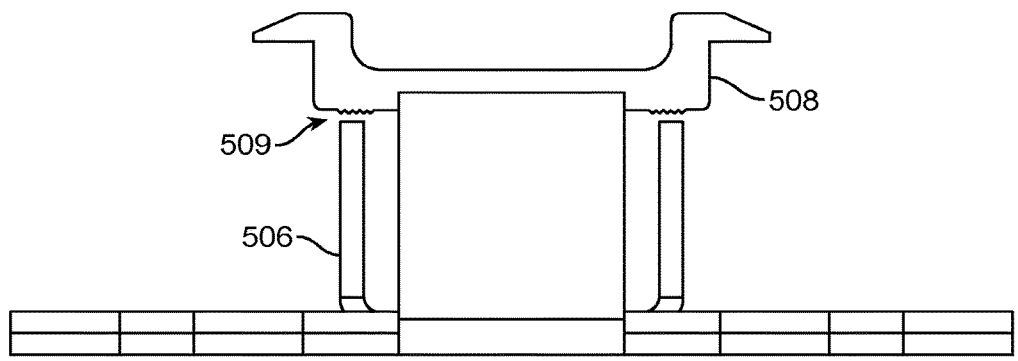

As shown in FIG. 5A, the upper plate 502 and lower plate 503 can flex independently of one another when exposed to downward force and can have tapered ends 505 to reduce in cross sectional area as they extend away from the center of the sheet metal bottom clamp 501, yielding a non-linear deflection at the points of the tapered ends 505 as compared to the main body of the sheet metal bottom clamp 501. This tapered feature reduces the point stress imposed on a solar energy panel when exposed to a downward force. Upper plate flange 506 protrudes a vertical distance below the top clamp to have a similar functionality as the vertical protrusions 302 and 303 described in FIGS. 3A and 3B. Lower plate flange 507 extends vertically and exteriorly to upper plate 502, and may be dimensioned to secure upper plate 502 to lower plate 503 via a press fit. Lower plate flange 507 has a width such that it will act as a guide similar to vertical protrusions 302 and 303 described in FIG. 4. Lower plate flange 507 may extend a height to coincide with the edge of the top clamp at point 508. The lower plate flange 507 may therefore prevent the top clamp from rotating relative to the sheet metal bottom clamp 501. FIG. 5B depicts gap 509 created between upper plate flange 506 and the top clamp. Gap 509 has the similar functionality as gap 401 described in FIG. 4.

Figure 6:
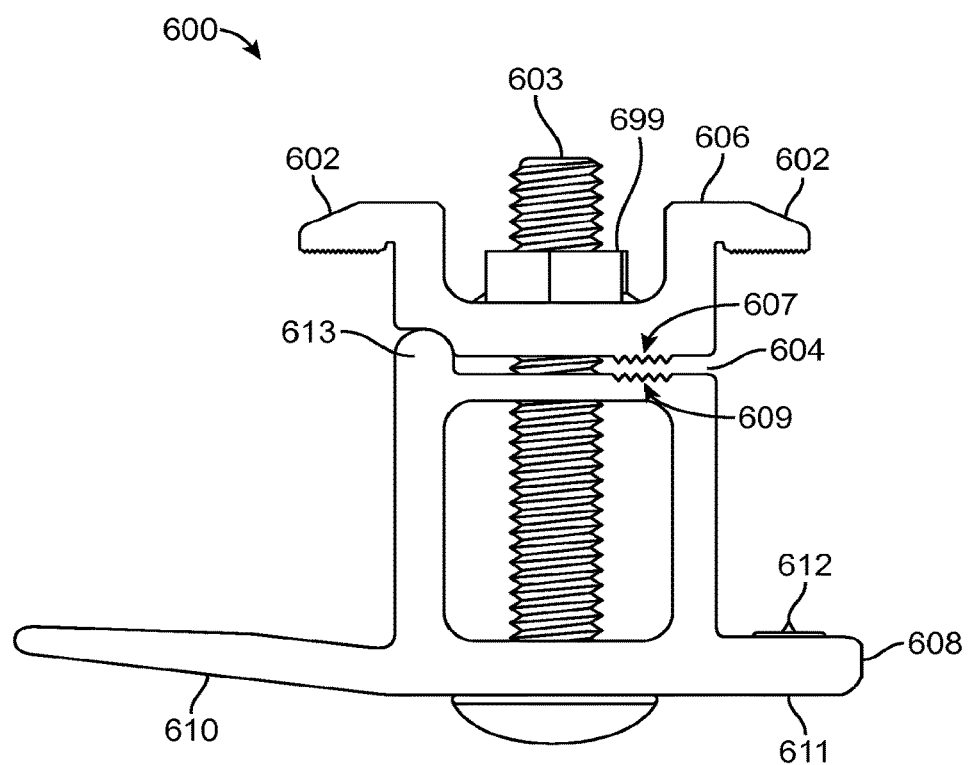
FIG. 6 illustrates a side view of an asymmetrical clamp assembly according to some embodiments of the present technology.

FIG. 6 illustrates a side view of another clamp assembly 600 according to some embodiments of the present technology. The clamp assembly 600 includes a top clamp 606 and a bottom clamp 608 secured together with a fastener 603 through apertures (not shown) in the top clamp 606 and bottom clamp 608 and a nut 699.

The top clamp 606 can have an offset flange 602 that protrudes horizontally away from the body of the clamp. Also, the bottom clamp 608 can have flanges 610, 611 on both sides of fastener 603 in order to capture multiple solar energy panels. According to FIG. 6, the flanges 610, 611 are asymmetrical and can serve independent purposes. The flange 611 can include a surface for supporting downward forces from a solar panel. Also the flange 611 can have one or more vertically protruding spike 612 to penetrate the anodization layer of a solar panel and create an electrical grounding and bonding path.

Figure 7A:
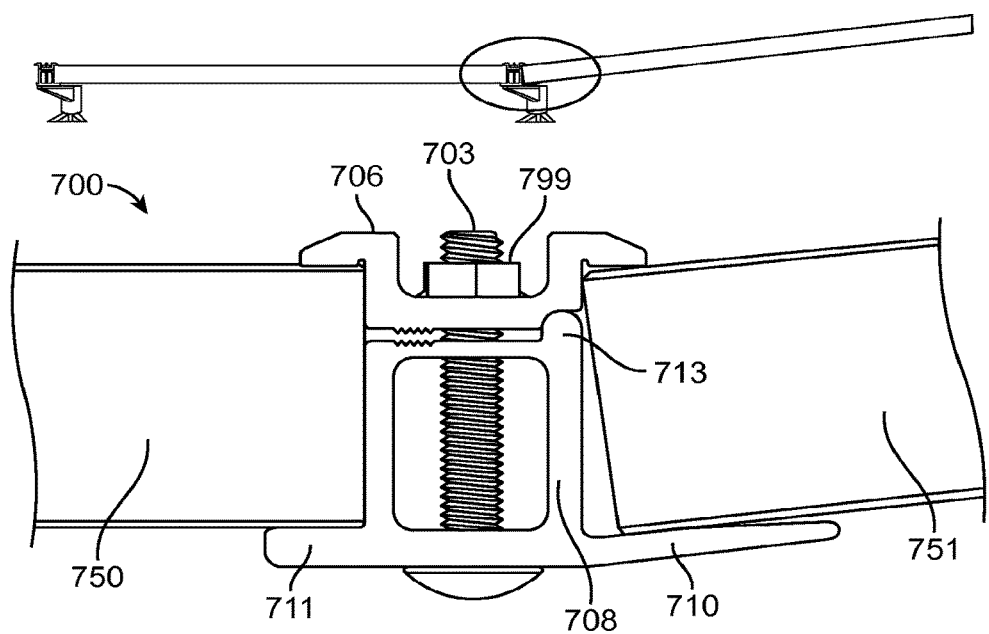
FIGS. 7A and 7B illustrate views of an asymmetrical clamp assembly having solar panels installed therein according to some embodiments of the present technology.
Figure 7B:
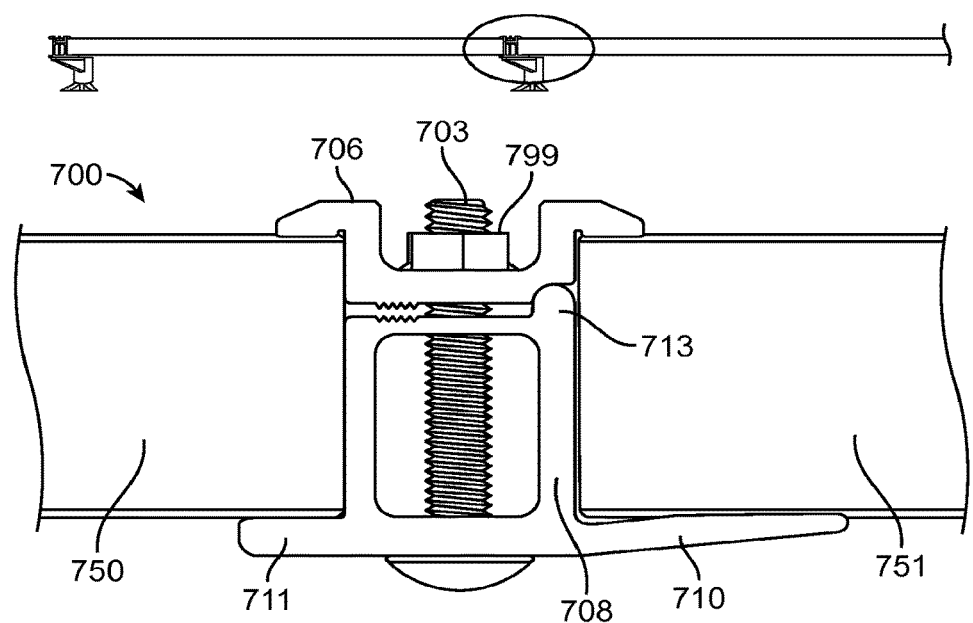

The flange 610 can have an upward tilted configuration for allowing a solar panel to be slid between the top clamp 606 and bottom clamp 608 at an angle (as shown in FIGS. 7A and 7B below). In some embodiments, the flange 610 can be displaced (in the −y direction) when a solar panel is installed between the top clamp 606 and bottom clamp 608.

The bottom clamp 608 can also have a vertical protrusion 613 to prevent the top clamp 606 from being tightened, when a solar energy panel is installed on the opposite side, so much that the top clamp 606 would exert excessive torque on the fastener 603, as explained in greater detail above in discussing FIGS. 3A and 3B. Also, the vertical protrusion 613 can be dimensioned so as to create a gap 604 between the top clamp 606 and the bottom clamp 608 when they joined using the fastener 603. The gap 604 can act as a secondary clamp (e.g. for accessories) as shown above in FIG. 4. The top clamp 606 and the bottom clamp 608 can each have a set of grooves 607, 609 facing each other in the gap 604 that help induce additional friction on the accessories.

FIGS. 7A and 7B illustrate views of a clamp assembly 700 with solar panels 750, 751 installed therein according to some embodiments of the present technology. As shown in FIG. 7A, a solar panel 750 is clamped between top clamp 706 and the flange 711 of the bottom clamp 708. The vertical protrusion 713 on its top surface of the bottom clamp 708 prevents the top clamp 706 from causing the fastener 703 to bend when a nut 799 is tightened down to secure the solar panel 750 in place. In other words, the vertical protrusion 713 maintains the top clamp 706 in a substantially parallel position relative to the bottom clamp 706 as the nut 799 is tightened down and only a solar panel 750 is in one side of the clamp assembly.

Also, the flange 710 is configured at an angle or radius to allow solar panel 751 to be slide into the clamp assembly 700 when the solar panel 750 is already clamped therein. The angled flange feature allows an installer to serially install adjacent solar panels without having to loosen a previously tightened fastener and without having to bend over to uncomfortable and/or dangerous angles.

As shown in FIG. 7B, after the solar panel 751 is placed between the angled flange 710 and the top clamp and is articulated to an installation level, e.g. planar to the installation surface, level with the solar panel 750, etc. In some embodiments of the present technology, the solar panel 751 displaces the flange 710. Additionally, when the solar panel 751 is clamped into the clamp assembly 700, the solar panel 751 applies upward force on the top clamp, thereby removing pressure on the protrusion 713 and more evenly distributing pressure onto the nut 799.

Figure 8A:
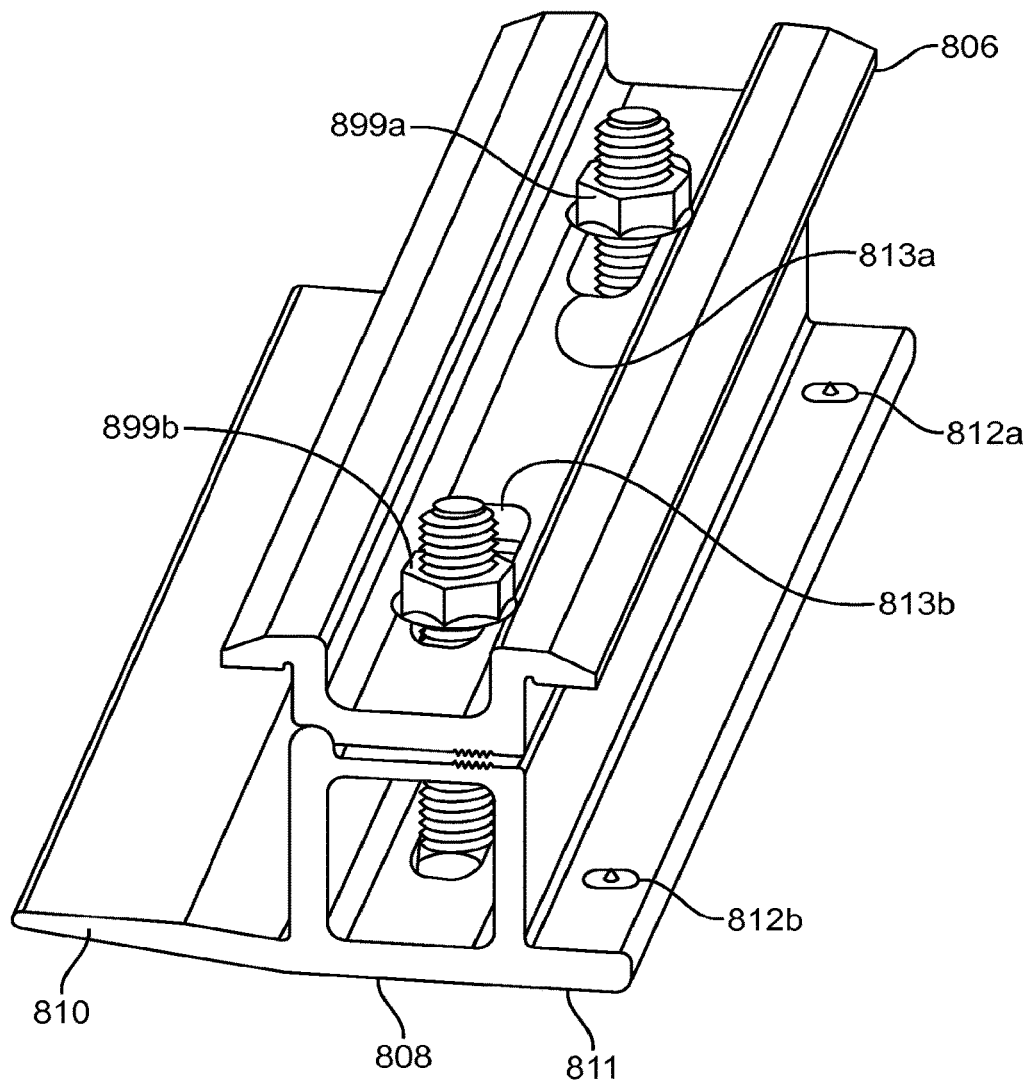
FIG. 8A illustrates an example a bridge clamp assembly according to some embodiments of the present technology.

The clamps described in the present disclosure can be used to support solar energy panels on an installation surface. Additionally, the clamp assemblies can also be used to bridge adjacent solar energy panels. FIG. 8A illustrates an example of a bridge clamp assembly 800 according to some embodiments of the present technology. The bridge clamp assembly 800 includes a top bridge 806 and a bottom bridge 808 secured together with multiple fasteners 803a, 803b through apertures 813a, 813b and nuts 899a, 899b. The bottom clamp 808 of the bridge clamp assembly 800 has asymmetrical flanges 810, 811 similar to the flanges 610, 611 and 710, 711 described above. In some embodiments, top bridge 806 and bottom bridge 808 have identical or substantially similar cross-sectional geometries as top clamp 710 and bottom clamp 711. This allows for reduced manufacturing costs as the same profile shape can be used for multiple parts.

The bridge clamp assembly 800 may also include multiple spikes 812a, 812b to penetrate the anodization layer of a solar energy panel frame with the purpose of creating an electrical grounding and bonding path between adjacent solar panels.

Figure 8B:
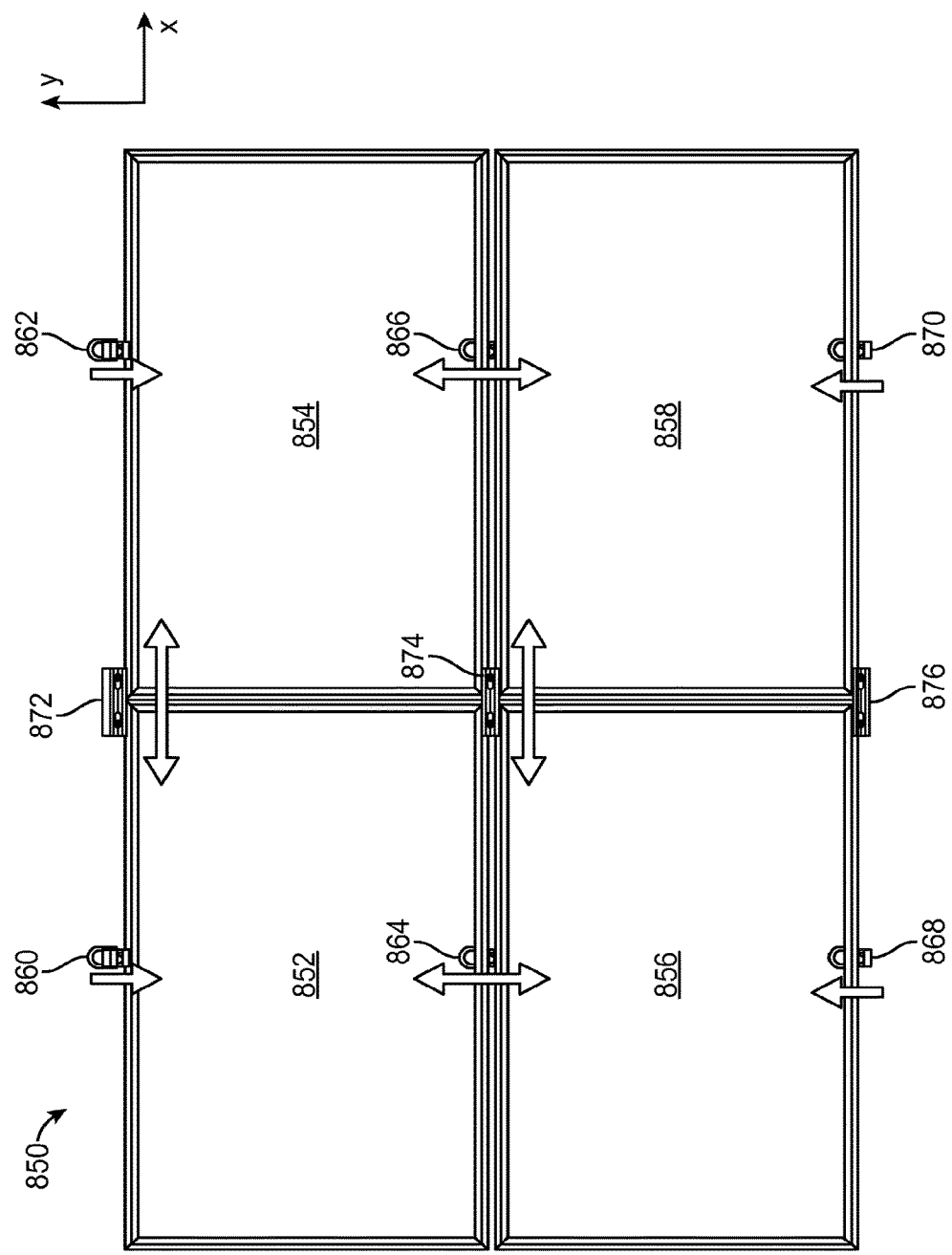
FIG. 8B illustrates a top view of a matrix of solar panels which are supported and secured together using clamp assemblies and bridge clamp assemblies according to some embodiments of the present technology.

FIG. 8B illustrates a top view of a matrix 850 of solar panels 852, 854, 856, 858 which are supported and secured together using clamp assemblies 860, 862, 864, 866, 868, 870 and which are further secured together using bridge clamp assemblies 872, 874, 876. The clamp assemblies 860, 862, 864, 866, 868, 870 can include sharp spikes protruding upward and/or downward to cut a coating, such as anodization or paint, on the bottom clamp, top clamp and/or the solar energy panel, thereby electrically bonding and grounding the components and the panels and creating a grounding/bonding path between vertically coupled (indicated by the arrows in the y-direction) solar panels and clamp assemblies. Similarly, the bridge clamp assemblies 872, 874, 876 can have multiple spikes that penetrate the anodization layer of a solar energy panels, thereby electrically bonding and grounding the components and the panels and creating a grounding/bonding path between horizontally coupled (indicated by the arrows in the x-direction) solar panels and clamp assemblies.

In some embodiments of the present technology, the top clamp and bottom clamp can be manufactured using an aluminum extrusion process having a good weight to strength ratio, while being less expensive than other processes. Additionally it allows for complex designs in one plane of each part. The top or bottom clamp can be manufactured using one or more stamped and formed pieces of sheet metal, (e.g. of aluminum or stainless steel). A stamped and formed process has the advantages of being cost effective while allowing different shapes and protrusions in three dimensions without a secondary machining operation. The top and bottom clamp can also be made of a composite material, a composite material molded over a reinforcing metal structure, etc. The composite material selection has the benefits of being electrically non-conductive, thereby reducing or eliminating the need to electrically ground and bond the top and bottom clamps to a solar energy panel or other metallic components.

Figure 9:
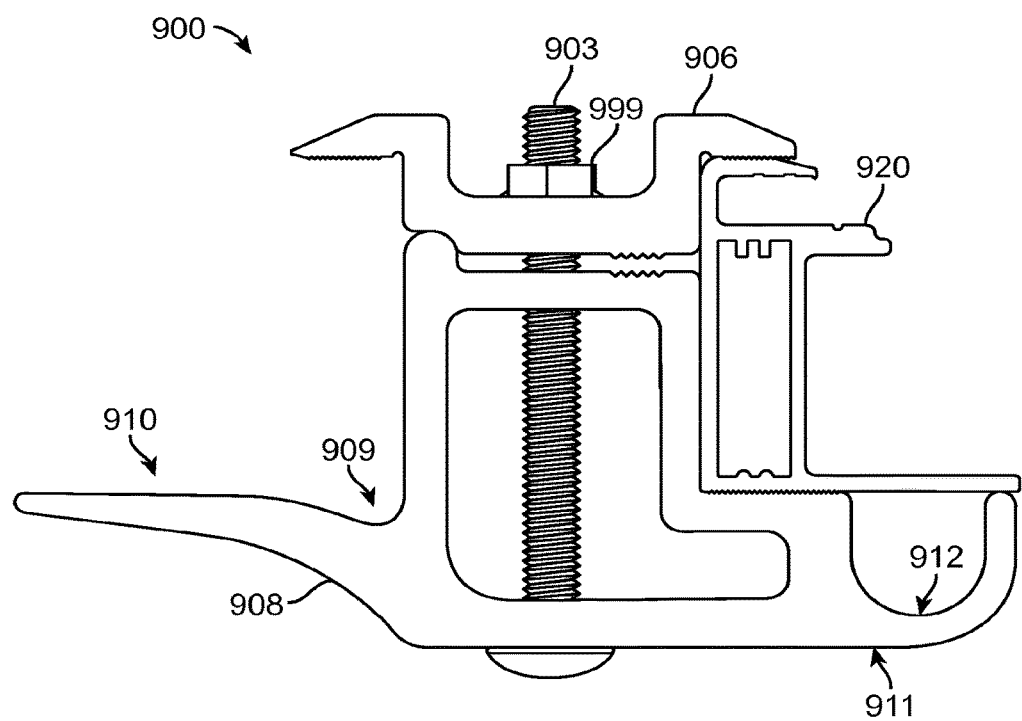
FIG. 9 illustrates a side view of another clamp assembly according to some embodiments of the present technology.

FIG. 9 illustrates a side view of another clamp assembly 900 according to some embodiments of the present technology. The clamp assembly 900 includes a top clamp 906 and a bottom clamp 908 that can be secured together with a fastener 903 through apertures (not shown) in the top clamp 906 and bottom clamp 908 and with a nut 999.

According to FIG. 9, the bottom clamp 908 has flanges 910, 911 on both sides of fastener 903 in order to capture multiple solar energy panels. The flange 911 can include a surface for supporting downward forces from a solar panel and a u-shaped groove 912 that can be configured to hold wires and that can be enclosed when a solar panel module 920 is clamped between the top clamp 906 and bottom clamp 908. The flange 910 can also have a dipped groove 909 that acts as a recess to allow a solar panel to be installed between top clamp 906 and bottom 908 after fastener 903 has been tightened on a solar panel 920 has been installed. This process of installation is described in FIG. 7. Flange 910 may have a curvature to on the top surface to more evenly distribute stresses induced when a solar panel (not shown) is installed.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A solar panel clamp assembly comprising:
   a top clamp comprising:
      a substantially planar plate;
      a first raised top flange with a substantially flat lower surface, the first raised top flange on a first terminal edge of a first surface that extends upwards from the plate;
      a second raised top flange with a substantially flat lower surface, the second raised top flange on a second terminal edge of a second surface that extends upwards from the plate in a direction substantially parallel to the plate and in substantially the opposite direction than the first raised top flange;
      a top clamp recess; and
      a top clamp aperture disposed through the plate; and
   a bottom clamp comprising:
      a base member having a top surface and a lower surface;
      a first base flange extending away from the lower surface of the base member;
      a second base flange extending away from the lower surface of the base member in substantially the opposite direction than the first base flange;
      a bottom clamp vertical protrusion, the bottom clamp vertical protrusion cooperating with the top clamp recess; and
      a bottom clamp aperture extending through the base member,
   wherein the top clamp and the bottom clamp are configured to clamp together with a fastener that extends through the top clamp aperture and the bottom clamp aperture.

2. The solar panel clamp assembly of claim 1, wherein the first raised top flange is substantially symmetrical to the second raised top flange, and wherein the first base flange is substantially symmetrical to the second base flange.

3. The solar panel clamp assembly of claim 1, wherein the first base flange is substantially parallel with the plane of the plate, wherein the second base flange is angled upward toward the top clamp such that an interface between the second base flange and the plate is lower than an interface between the first base flange and the plate.

4. The solar panel clamp assembly of claim 3, wherein the second base flange has a curvature to reduce point stresses on an installed solar energy panel.

5. The solar panel clamp assembly of claim 3, wherein the second base flange is displaced downward, thereby compressing a frame of a solar panel when a solar panel is inserted between the top clamp and the bottom clamp.

6. The solar panel clamp assembly of claim 3, wherein the top surface of the bottom clamp further comprises an upward facing protrusion on a side of the second base flange, wherein the upward facing protrusion is configured to engage a bottom surface of the plate when a solar panel is clamped between the first raised top flange and the first base flange, thereby acting as a fulcrum to allow for clamping the top clamp and bottom clamp with only one solar panel installed while preventing the top clamp from being angled askew with respect to the bottom clamp.

7. The solar panel clamp assembly of claim 1, wherein the top clamp aperture and bottom clamp aperture comprise a slot for allowing the top clamp and bottom clamp to adjust laterally without moving the fastener when the fastener is fixed to a particular location.

8. The solar panel clamp assembly of claim 1, wherein the first and second base flanges taper in cross-sectional area as they extend from the center, thereby reducing point stresses on a supported solar energy panel.

9. The solar panel clamp assembly of claim 1, wherein the first base flange has a groove for supporting electrical wiring.

\* \* \* \* \*